(12) United States Patent
Huber et al.

(10) Patent No.: US 8,505,464 B2
(45) Date of Patent: Aug. 13, 2013

(54) CONTROL STRATEGY FOR PROVIDING REGENERATIVE ELECTRICAL POWER TO TROLLEY LINE IN TROLLEY CAPABLE MINING TRUCK

(75) Inventors: Brian Huber, Carpentersville, IL (US); Eric J. Ruth, Peoria, IL (US); Bradley S. Bailey, Peoria, IL (US); Matthew L. Hendrickson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/308,973

(22) Filed: Dec. 1, 2011

(65) Prior Publication Data

US 2013/0140121 A1    Jun. 6, 2013

(51) Int. Cl.
*B60S 13/02* (2006.01)

(52) U.S. Cl.
USPC ........................... 105/49; 191/33 R; 104/287

(58) Field of Classification Search
USPC ....... 104/287, 288, 289, 291, 292; 191/22 R, 191/29 R, 29 DM, 33 R, 35, 36, 22 C
See application file for complete search history.

(56) References Cited

U.S. PATENT DOCUMENTS

| | | | | |
|---|---|---|---|---|
| 3,847,089 A * | 11/1974 | Nelson | | 104/291 |
| 4,358,719 A * | 11/1982 | Currier et al. | | 318/161 |
| 5,221,880 A | 6/1993 | Bartholow et al. | | |
| 5,293,947 A | 3/1994 | Stratton | | |
| 5,351,775 A * | 10/1994 | Johnston et al. | | 180/65.31 |
| 5,582,262 A * | 12/1996 | Wust | | 180/2.1 |
| 5,886,619 A * | 3/1999 | Takasan et al. | | 370/276 |
| 6,268,673 B1 * | 7/2001 | Shah et al. | | 310/90.5 |
| 6,396,178 B1 * | 5/2002 | Chiu | | 310/67 R |
| 6,612,245 B2 * | 9/2003 | Kumar et al. | | 105/26.05 |
| 6,646,360 B2 * | 11/2003 | Brown | | 307/43 |
| 6,742,630 B2 * | 6/2004 | Eilinger | | 187/290 |
| 7,385,372 B2 | 6/2008 | Ahmad et al. | | |
| 7,812,555 B2 * | 10/2010 | Adra | | 318/376 |
| 7,956,762 B2 * | 6/2011 | Bailey et al. | | 340/648 |
| 8,054,016 B2 * | 11/2011 | Gottemoller et al. | | 318/380 |
| 8,069,792 B2 * | 12/2011 | Shapery | | 104/287 |
| 8,140,206 B2 * | 3/2012 | Bailey et al. | | 701/22 |
| 2002/0014383 A1 * | 2/2002 | Brooks | | 191/33 R |
| 2004/0238243 A1 * | 12/2004 | King et al. | | 180/65.2 |
| 2009/0032350 A1 * | 2/2009 | Shapery | | 191/10 |
| 2009/0127048 A1 * | 5/2009 | Ichimura | | 191/33 R |
| 2010/0025167 A1 * | 2/2010 | Staub et al. | | 188/156 |
| 2010/0063646 A1 * | 3/2010 | Ibaiondo Madariaga et al. | | 700/297 |
| 2010/0282557 A1 * | 11/2010 | He et al. | | 191/33 R |

(Continued)

FOREIGN PATENT DOCUMENTS

KR    1020090131917    12/2009
WO         0037279     6/2000

*Primary Examiner* — Jason C Smith
(74) *Attorney, Agent, or Firm* — Liell & McNeil

(57) ABSTRACT

A trolley capable mining truck includes a pantograph supported on a machine frame for electrically connecting the truck with an overhead trolley line. A power system includes an onboard electrical power source providing electrical power to electric drive propulsion motors along a first electrical path in a first configuration of the power system. The pantograph provides electrical power from the overhead trolley line to the electric drive propulsion motors along a second electrical path, which includes a transient damping reactor, in a second configuration of the power system. The power system also includes a third configuration in which, during a braking mode of the trolley capable mining truck, the electric drive propulsion motors provide regenerative electrical power to the overhead trolley line through the pantograph along a third electrical path including a regenerative power converter, wherein the regenerative power converter includes the transient damping reactor.

14 Claims, 3 Drawing Sheets

(56) References Cited

U.S. PATENT DOCUMENTS

| | | | |
|---|---|---|---|
| 2010/0289443 A1* | 11/2010 | Mazumdar et al. | 318/440 |
| 2010/0300780 A1* | 12/2010 | Caruso et al. | 180/65.21 |
| 2011/0024212 A1* | 2/2011 | Adra | 180/65.245 |
| 2011/0094808 A1* | 4/2011 | Mazumdar et al. | 180/65.22 |
| 2011/0094841 A1* | 4/2011 | Mazumdar et al. | 191/33 R |
| 2011/0175579 A1* | 7/2011 | Mazumdar | 320/167 |
| 2012/0085612 A1* | 4/2012 | Churchill | 191/33 R |
| 2012/0175209 A1* | 7/2012 | Mazumdar et al. | 191/2 |

* cited by examiner

CONTROL STRATEGY FOR PROVIDING REGENERATIVE ELECTRICAL POWER TO TROLLEY LINE IN TROLLEY CAPABLE MINING TRUCK

TECHNICAL FIELD

The present disclosure relates generally to a trolley capable mining truck, and more particularly to a strategy for providing regenerative electrical power to an overhead trolley line during a braking mode of the trolley capable mining truck.

BACKGROUND

Large off-highway machines, such as mining trucks, are known to employ electric drive propulsion systems to propel or retard the machine. Typically, an electric drive propulsion system includes an alternator, or other electrical power generator, driven by an internal combustion engine. The alternator, in turn, supplies electrical power to one or more electric drive propulsion motors connected to wheels, or other ground engaging elements, of the machine. Some of these large mining trucks are also configured to receive electrical power from an overhead trolley line. Specifically, at mining sites having overhead trolley lines installed, a pantograph, or other similar device, coupled with the mining truck may be moved into electrical contact with the overhead trolley line. When engaged, the pantograph enables electrical power from a substation to be drawn from the overhead trolley line and used to power the electric drive propulsion motors. Typically, the overhead trolley line may be used to power the electric drive propulsion motors when the mining truck, or trolley capable mining truck, has a relatively high electrical power demand, such as when the mining truck is loaded and is traveling uphill.

U.S. Published Patent Application No. 2011/0094841 to Mazumdar et al. teaches an on-board electrical storage system for a trolley-based electric mining haul truck that may be used to store retard electrical energy created during dynamic braking. This stored energy, as suggested by the disclosure, may be used to supplement trolley power during an uphill haul. The Mazumdar reference also suggests that, particularly when the on-board electrical storage system is fully charged, the retard electrical energy from the wheel motors may be fed through inverters and returned to the utility grid. According to U.S. Published Patent Application No. 2011/0175579 to Mazumdar, the retard electrical energy stored in the on-board electrical storage system may be used to provide auxiliary power to components, such as computers, displays, and control systems, when the electric mining vehicle is not receiving trolley power.

The Mazumdar references introduced above primarily discuss an on-board electrical storage system for trolley-based electric mining vehicles. Although the Mazumdar references suggest particular means for reducing wasted electrical energy, there is a continuing need for alternative ways to reduce waste. Further, there is a continuing need for improved efficiency, including electrical efficiency, in the context of trolley capable mining trucks, while maintaining or improving performance and reliability.

The present disclosure is directed to one or more of the problems or issues set forth above.

SUMMARY OF THE DISCLOSURE

In one aspect, a trolley capable mining truck includes ground engaging propulsion elements coupled with a machine frame. A pantograph is supported on the machine frame and has an engaged configuration in which the pantograph is electrically connected with an overhead trolley line and a stowed configuration in which the pantograph is electrically disconnected from the overhead trolley line. A power system includes an onboard electrical power source, which includes an internal combustion engine coupled to an electrical power generator, providing electrical power to a pair of electric drive propulsion motors along a first electrical path in a first configuration of the power system. The electric drive propulsion motors, in turn, power the ground engaging propulsion elements. The pantograph provides electrical power from the overhead trolley line to the pair of electric drive propulsion motors along a second electrical path, which includes a transient damping reactor, in a second configuration of the power system. The power system also includes a third configuration in which, during a braking mode of the trolley capable mining truck, the electric drive propulsion motors provide regenerative electrical power to the overhead trolley line through the pantograph along a third electrical path including a regenerative power converter, wherein the regenerative power converter includes the transient damping reactor.

In another aspect, a method of operating a trolley capable mining truck including a power system includes a step of moving a pantograph into a stowed configuration in which the pantograph is electrically disconnected from an overhead trolley line. The trolley capable mining truck is propelled in a first configuration of the power system responsive to the stowed configuration at least in part by providing electrical power from an onboard electrical power source including an internal combustion engine coupled to an electrical power generator to a pair of electric drive propulsion motors. The method also includes a step of moving the pantograph into an engaged configuration in which the pantograph is electrically connected to the overhead trolley line. The trolley capable mining truck is propelled in a second configuration of the power system responsive to the engaged configuration at least in part by providing electrical power from the overhead trolley line, through the pantograph, through a transient damping reactor, and to the electric drive propulsion motors. In a third configuration of the power system and during a braking mode of the trolley capable mining truck, regenerative electrical power is provided from the electric drive propulsion motors to the overhead trolley line through the pantograph along a third electrical path including a regenerative power converter, wherein the regenerative power converter includes the transient damping reactor.

DETAILED DESCRIPTION

Figure 1:
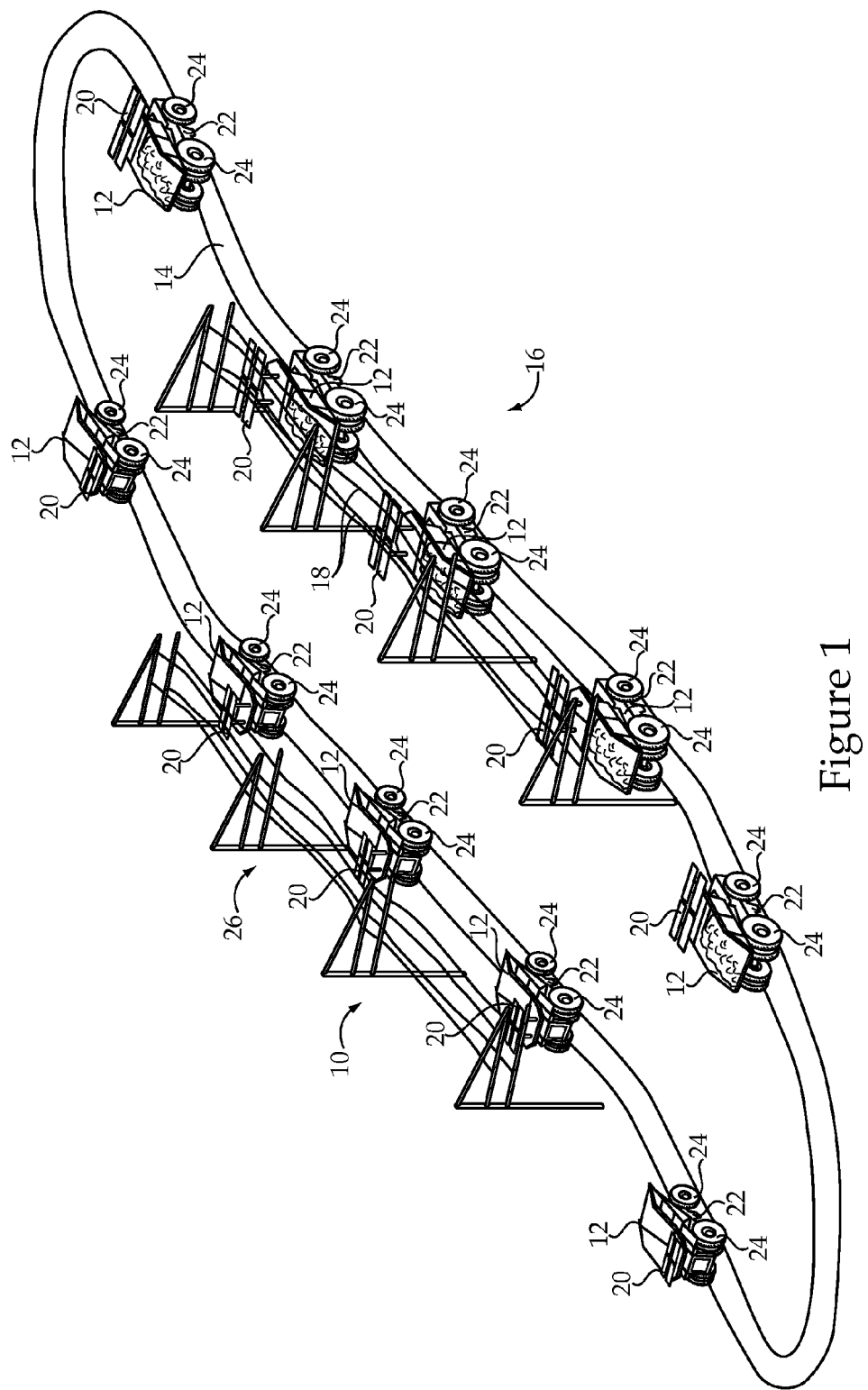
FIG. 1 is a diagrammatic view of a fleet of trolley capable mining trucks in an exemplary trolley capable mining environment, according to the present disclosure.

An exemplary embodiment of a trolley capable mining environment 10 is shown generally in FIG. 1. Specifically, FIG. 1 shows a plurality of trolley capable mining trucks 12 traveling on a predetermined path 14 along which the trolley capable mining trucks 12 may be loaded and unloaded. For example, while traveling along an uphill segment 16 of the path 14, such as to an unloading site, loaded trolley capable mining trucks 12 may be electrically connected to overhead trolley lines 18 such that electrical power from the overhead trolley lines 18 may be used to provide propulsion power to the trucks 12. In particular, each trolley capable mining truck 12 may include a pantograph 20, supported on a machine frame 22 and movable between an engaged, or raised, configuration and a stowed, or lowered, configuration. In the engaged configuration, as shown at least with respect to the trolley capable mining trucks 12 traveling under the overhead trolley lines 18, the pantograph 20 electrically connects the overhead trolley lines 18 with the trolley capable mining truck 12 such that electrical power from the overhead trolley lines 18 may be used to drive ground engaging propulsion elements 24, such as wheels, of the truck 12. When the trolley capable mining truck 12 is not traveling under the overhead trolley lines 18, or it is otherwise undesirable to electrically connect the trolley capable mining truck 12 with the overhead trolley lines 18, the pantograph 20 may be moved into the stowed configuration, shown at least with respect to the trolley capable mining trucks 12 transitioning between the uphill segment 16 and a downhill segment 26. As shown, the trolley capable mining trucks 12 may also be electrically connected to the overhead trolley lines 18 while traveling along the downhill segment 26 of the path 14.

Figure 2:
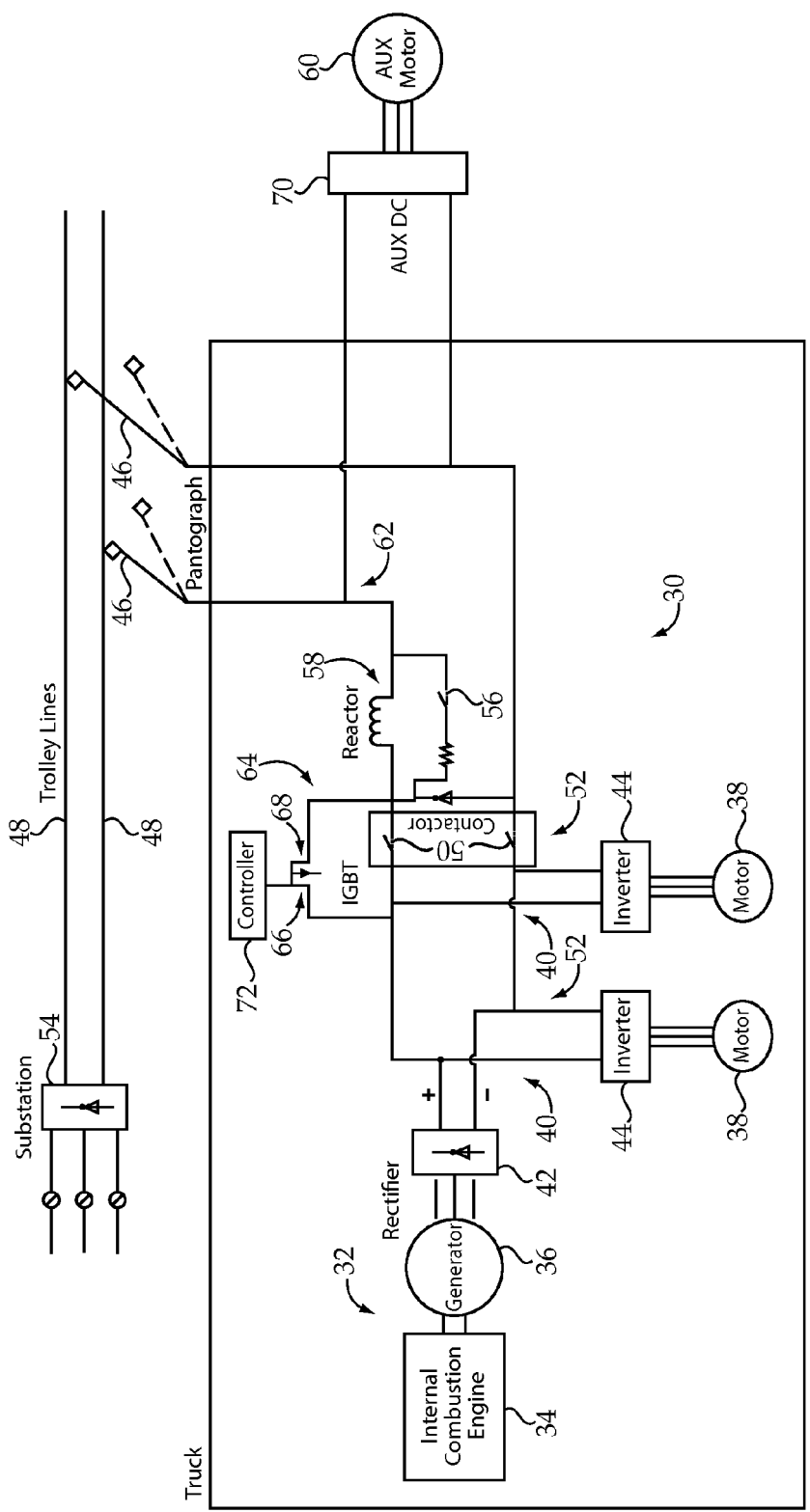
FIG. 2 is a schematic of a power system of one of the trolley capable mining trucks of FIG. 1, according to one aspect of the present disclosure.

Turning now to FIG. 2, a first exemplary embodiment of a power system for one of the trolley capable mining trucks 12 is shown generally at 30. The power system 30 includes an onboard electrical power source 32, which, according to the exemplary embodiment, includes an internal combustion engine 34. The internal combustion engine 34, which may be a compression or spark-ignited engine, is coupled with and provides mechanical power to an electrical power generator 36. The onboard electrical power source 32, in a first configuration of the power system 30, provides electrical power to a pair of electric drive propulsion motors 38 along first electrical paths 40. According to the exemplary embodiment, the electrical power generator 36 may produce an alternating electrical current that is supplied to one or more rectifiers 42. The rectifiers 42 may convert the alternating electrical current to a direct electrical current and may feed the direct electrical current to a plurality of inverters 44. The inverters 44 may convert the direct electrical current into alternating electrical current used to power three phase alternating current electric drive propulsion motors 38. The electric drive propulsion motors 38 are coupled to and power the ground engaging elements 24, shown in FIG. 1.

One or more electrical components along the first electrical paths 40 may condition the electrical power to provide a voltage and current sufficient to power the electric drive propulsion motors 38. According to a specific example, electrical power may be supplied to the electric drive propulsion motors 38 at 2400 volts. It may also be desirable to modulate the frequency of the electrical current to control the speed of the electric drive propulsion motors 38, which ultimately power the ground engaging propulsion elements 24 and control the ground speed of the trolley capable mining truck 12. It should be appreciated that the first electrical paths 40 may include any additional electrical components necessary to facilitate the functionality described herein.

In the first configuration of the power system 30, pantograph 46, similar to the pantographs 20 of FIG. 1, may be in a stowed configuration (shown in phantom), in which the pantograph 46 is electrically disconnected from overhead trolley lines 48. Also, in the first configuration of the power system 30, first contactor 50 may be open (shown). Thus, in the first configuration, overhead trolley lines 48 do not provide electrical power to the electric drive propulsion motors 38, but, rather, the onboard electrical power source 32 exclusively provides electrical power to the electric drive propulsion motors 38, such as along the first electrical paths 40 described above.

In a second configuration of the power system 30, the pantograph 46 may provide electrical power from the overhead trolley lines 48 to the electric drive propulsion motors 38 along second electrical paths 52. Specifically, according to the second configuration of the power system 30, the pantograph 46 is in the engaged configuration (shown), in which the pantograph 46 is electrically connected with the overhead trolley lines 48. As such, power from an electric substation 54 is supplied to the trolley capable mining truck 12 via the overhead trolley lines 48 and pantograph 46. The substation 54 may include one or more rectifiers converting alternating electrical current to direct electrical current, which may be provided along the overhead trolley lines 48. In the second configuration, the first contactor 50 and a second contactor 56 are closed (both shown in phantom) and, thus, direct electrical current may be supplied along the second electrical paths 52 to the inverters 44, which may convert the direct electrical current into alternating electrical current to be supplied to the electric drive propulsion motors 38. According to an exemplary embodiment, the rectifier 42 may be used in conjunction with a diode, which may become reverse biased when the higher voltage overhead trolley lines 48 are supplying electrical power to the electric drive propulsion motors 38. Thus, in the second configuration, the electric drive propulsion motors 38 are exclusively powered by the overhead trolley lines 48.

A transient damping reactor 58 is also provided along the second electrical paths 52 for filtering voltage transients occurring when the pantograph 46 electrically connects with the overhead trolley lines 48. The transient damping reactor 58 may reduce harmonics and transient voltages that may occur when the pantograph 46 contacts the overhead trolley lines 48. Such voltage transients, if not dissipated, may be large enough to raise the voltage of electrical components of the power system 30 to undesirable levels, which may result in potential damage or faults being indicated. Since the voltage transients may occur during connection of the pantograph 46 with the overhead trolley lines 48, the transient damping reactor 58 may only be used, for transient damping purposes, a few milliseconds each connection, which may only occur once an hour, or even less frequently.

The power system 30 may also include a third configuration in which the onboard electrical power source 32 provides electrical power to at least one auxiliary device 60 along a third electrical path 62. The third electrical path 62 includes an auxiliary power converter 64 including the transient damping reactor 58. Specifically, according to the third configuration, the pantograph 46 is in the stowed configuration, the first contactor 50 is closed, and the second contactor 56 is open (shown). According to the exemplary embodiment, the auxiliary power converter 64 may include an insulating gate bipolar transistor (IGBT) 66 and a diode 68. The auxiliary power converter 64 may change, such as raise or lower, the voltage of the power provided from the rectifier 42 such that it is suitable for powering the auxiliary device 60. The transient damping reactor 58 then smoothes the voltage waveforms of the electrical power provided by the IGBT 66 and diode 68 to the auxiliary device 60. The third electrical path 62 may include additional electrical components, such as, for example, an inverter 70 for converting the direct electrical current into alternating electrical current. Such additional components may depend on the particular type of auxiliary components being powered. Such auxiliary components may include, for example, any auxiliary devices on the trolley capable mining truck 12, such as, for example, auxiliary motors.

In the third configuration of the power system 30, the onboard electrical power source 32 may also provide electrical power to the electric drive propulsion motors 38 along the first paths 40, as described above. To effect control decisions regarding the power system 30, the trolley capable mining truck 12, as shown, may also include an onboard electronic controller 72 capable of switching between the first, second, and third configurations. According to a specific example, the onboard electronic controller 72 may transition the power system 30 to the third configuration only if the pantograph 46 is in the stowed configuration and a power requirement of the electric drive propulsion motors 38 is less than a predetermined threshold. Particularly, for example, if the onboard electrical power source 32, as opposed to the overhead trolley lines 48, is powering the electric drive propulsion motors 38, it may be desirable to power the auxiliary device 60 only when the power requirement of the electric drive propulsion motors 38 is not relatively high, as predetermined by the manufacturer or operator.

The onboard electronic controller 72 may be of standard design and may include a processor, such as, for example, a central processing unit, a memory, and an input/output circuit that facilitates communication internal and external to the onboard electronic controller 72. The processor may control operation of the onboard electronic controller 72 by executing operating instructions, such as, for example, computer readable program code stored in memory, wherein operations may be initiated internally or externally to the onboard electronic controller 72. A control scheme may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the onboard electronic controller 72. One skilled in the art will appreciate that any computer based system or device utilizing similar components for controlling the components of the trolley capable mining truck 12 and, more particularly, the power system 30, is suitable for use with the present disclosure.

According to the exemplary embodiment, the onboard electronic controller 72 may be in control communication with at least the auxiliary power converter 64 and the first and second contacts 50 and 56 to effect changes between the first, second, and third configurations of the power system 30. It should be appreciated, however, that the onboard electronic controller 72 may also be in communication with various other devices or components of the trolley capable mining truck 12 and, specifically, the power system 30, as necessary to provide the functionality described herein. Further, for example, the onboard electronic controller 72 may also be in control communication with an actuating mechanism, which may control movement of the pantograph 46 between the stowed and engaged configurations described herein.

Figure 3:
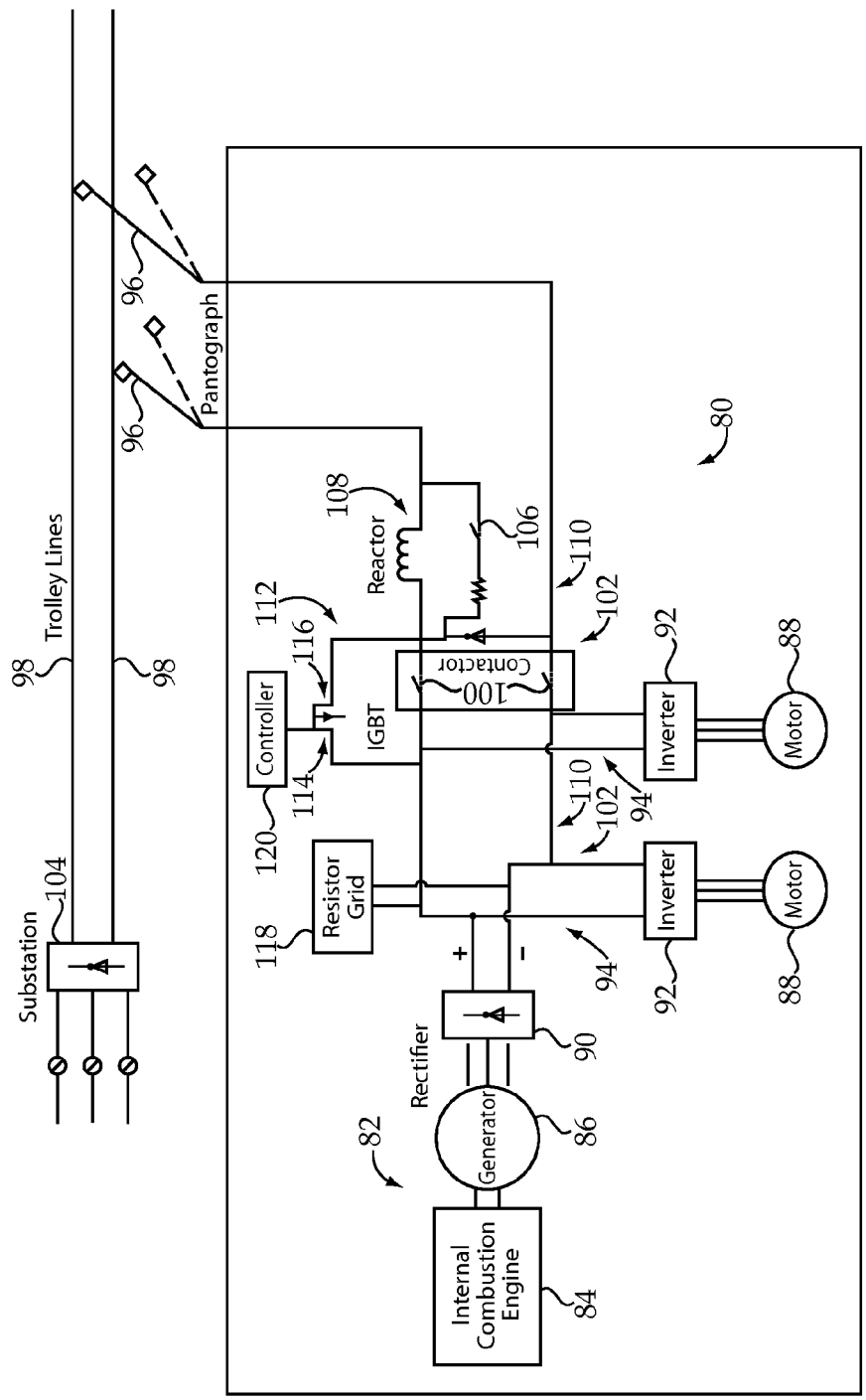
FIG. 3 is a schematic of an alternative power system of one of the trolley capable mining trucks of FIG. 1, according to another aspect of the present disclosure.

Turning now to FIG. 3, an alternative power system 80 for the trolley capable mining truck 12 is shown. The alternative power system 80 may be similar to the power system 30 of FIG. 2, particularly with respect to the first and second power system configurations. Specifically, power system 80 may have a first configuration in which an onboard electrical power source 82, including an internal combustion engine 84 and an electrical power generator 86, provides electrical power to a pair of electric drive propulsion motors 88. In particular, the electrical power generator 86 may produce an alternating electrical current that is supplied to a rectifier 90. The rectifier 90 may convert the alternating electrical current to a direct electrical current and may feed the direct electrical current to a plurality of inverters 92. The inverters 92 may convert the direct electrical current into alternating electrical current used to power the electric drive propulsion motors 88, which, in turn, power the ground engaging elements 24, shown in FIG. 1.

Thus, in the first configuration of the power system 80, the onboard electrical power source 82 may exclusively provide electrical power to the electric drive propulsion motors 88 along first electrical paths 94 that include some of the exemplary components described above. Also, in the first configuration of the power system 80, pantograph 96 may be in a stowed configuration (shown in phantom), in which the pantograph 96 is electrically disconnected from overhead trolley lines 98, and first contactor 100 may be open (shown). Additional electrical components necessary to facilitate the functionality described herein may be incorporated into the power system 80 along the first electrical paths 94.

According to a second configuration of the power system 80, the pantograph 96 may exclusively provide electrical power from the overhead trolley lines 98 to the electric drive propulsion motors 88 along second electrical paths 102. Specifically, according to the second configuration of the power system 80, the pantograph 96 is in the engaged configuration (shown), and power from an electric substation 104 is supplied to the trolley capable mining truck 12 via the overhead trolley lines 98 and pantograph 96. In the second configuration, the first contactor 100 and a second contactor 106 are closed (both shown in phantom) and, thus, direct electrical current from the overhead trolley lines 98 may be supplied along the second electrical paths 102 to the inverters 92, which may convert the direct electrical current into alternating electrical current to be supplied to the electric drive propulsion motors 88. The second electrical paths 102 also include a transient damping reactor 108, similar to transient damping reactor 58, for filtering voltage transients occurring when the pantograph 96 electrically connects with the overhead trolley lines 98.

According to a third configuration of the power system 80, and during a braking mode of the trolley capable mining truck 12, the electric drive propulsion motors 88 may provide regenerative electrical power to the overhead trolley line 98 through the pantograph 96 along third electrical paths 110. Specifically, such as when the trolley capable mining truck 12 is braking, which may occur frequently while the trolley capable mining truck 12 is traveling along the downhill segment 26 of FIG. 1, the electric drive propulsion motors 88 may be reversed and, thus, function as generators and effect slowing of the trolley capable mining truck 12. The regenerative electrical power produced by the electric drive propulsion motors 88 during braking may be supplied back to the overhead trolley lines 98 and ultimately to the electric substation 104. According to the third configuration, the pantograph 96 is in the engaged configuration, the first contactor 100 is closed, and the second contactor 106 is open (shown).

The third electrical paths 110 also include a regenerative power converter 112, which may function as a buck converter or a boost converter. The regenerative power converter 112, according to a specific example, may include an IGBT 114, a diode 116, and the transient damping reactor 108. The regenerative power converter 112 may change, such as raise or lower, the voltage of the power provided from the electric drive propulsion motors 88 such that it is suitable for supplying power to the overhead trolley lines 98. The transient damping reactor 108 then smoothes the voltage waveforms of the electrical power provided by the IGBT 114 and diode 116 to the overhead trolley lines 98 and ultimately the electric substation 104.

The power system 80 may also include a fourth configuration in which the electric drive propulsion motors 88 provide the regenerative electrical power, produced during braking, to a resistor grid 118 of the trolley capable mining truck 12, and the resistor grid 118 dissipates the regenerative electrical power into heat energy that is transferred into the atmosphere. To effect control decisions regarding the power system 80, the trolley capable mining truck 12, may also include an onboard electronic controller 120, similar to the onboard electronic controller 72 of FIG. 2, capable of switching between the first, second, third, and fourth configurations. According to a specific example, the onboard electronic controller 120 may transition the power system 80 to the third configuration only if the pantograph 96 is in the stowed configuration and the regenerative electrical power is above a predetermined threshold. Particularly, for example, it may only be desirable to supply regenerative electrical power to the overhead trolley lines 98 if the regenerative electrical power is deemed sufficient for such purposes.

INDUSTRIAL APPLICABILITY

The present disclosure finds potential application in any trolley capable machine. Further, the disclosure may be specifically applicable to trolley capable mining trucks configured to receive propulsion power from an onboard electrical generator and overhead trolley lines. Yet further, the present disclosure may be applicable to strategies for providing improved efficiency, including electrical efficiency, and enhancing capabilities in the context of trolley capable mining trucks, while maintaining or improving performance and reliability.

Referring generally to FIGS. 1-3, a method of operating a trolley capable mining truck 12 in a trolley capable mining environment 10 will be described. While traveling along a downhill segment 26 of a path 14, such as to a loading site within a mine, a pantograph 20, 46, 96 of the trolley capable mining truck 12 may be moved into a stowed configuration in which the pantograph 20, 46, 96 is electrically disconnected from overhead trolley lines 18, 48, 98. The trolley capable mining truck 12, in a first power system configuration, such as those described with reference to FIGS. 2 and 3, may be propelled by providing electrical power from an onboard electrical power source 32, 82, which includes an internal combustion engine 34, 84 coupled to an electrical power generator 36, 86, to a pair of electric drive propulsion motors 38, 88. The electric drive propulsion motors 38, 88 drive ground engaging propulsion elements 24, thus propelling the trolley capable mining truck 12 to the loading site where the trolley capable mining truck 12 may be loaded.

While traveling along an uphill segment 16 of a path 14, such as to an unloading site, the pantograph 20, 46, 96 may be moved into an engaged configuration in which the pantograph 20, 46, 96 is electrically connected to the overhead trolley lines 18, 48, 98. Thus, the loaded trolley capable mining truck 12 may be electrically connected to overhead trolley lines 18, 48, 98 such that electrical power from the overhead trolley lines 18, 48, 98 may be used to provide propulsion power to the trolley capable mining truck 12. In particular, and in a second power system configuration, such as those described with reference to FIGS. 2 and 3, the trolley capable mining truck 12 may be propelled by providing electrical power from the overhead trolley lines 18, 48, 98, through the pantograph 20, 46, 96, through a transient damping reactor 58, 108, and to the electric drive propulsion motors 38, 88. The transient damping reactor 58, 108 may reduce harmonics and transient voltages that may occur when the pantograph 20, 46, 96 contacts the overhead trolley lines 18, 48, 98.

Referring specifically to FIG. 2, and according to a third power system configuration discussed with reference to FIG. 2, the onboard electrical power source 32 may provide electrical power to at least one auxiliary device 60 along a third electrical path 62. The third electrical path 62 includes an auxiliary power converter 64 that includes the transient damping reactor 58. According to the exemplary embodiment, the auxiliary power converter 64 may include an IGBT 66 and a diode 68. The auxiliary power converter 64 may change, such as raise or lower, the voltage of the power provided from the rectifier 42 such that it is suitable for powering the auxiliary device 60. For example, the auxiliary device 60 might require a lower voltage of electrical power than that required by the electric drive propulsion motors 38. The transient damping reactor 58 then smoothes the voltage waveforms of the electrical power provided by the IGBT 66 and diode 68 to the auxiliary device 60.

Referring to an alternative third power system configuration, shown in and discussed with reference to FIG. 3, and during a braking mode of the trolley capable mining truck 12, the electric drive propulsion motors 88 may provide regenerative electrical power to the overhead trolley line 98 through the pantograph 96 along third electrical paths 110. The third electrical paths 110 may also include a regenerative power converter 112, which may function as a buck converter or a boost converter, and may include an IGBT 114, a diode 116, and the transient damping reactor 108. The regenerative power converter 112 may change, such as raise or lower, the voltage of the power provided from the electric drive propulsion motors 88 such that it is suitable for returning power to the overhead trolley lines 98. The transient damping reactor 108 then smoothes the voltage waveforms of the electrical power provided by the IGBT 114 and diode 116 to the overhead trolley lines 98 and ultimately the electric substation 104.

As stated above, the transient damping reactor 58, 108 may only be used, for transient damping purposes, a few milliseconds when the pantograph 20, 46, 96 connects with the overhead trolley lines 18, 48, 98. Since these connections may occur only once per hour, or less frequently, the transient damping reactor 58, 100, which is a relatively large electrical component, may occupy valuable space on the trolley capable mining truck 12 and provide limited, but necessary, functionality. As provided herein, the transient damping reactor 58, 100 may also be used as part of an auxiliary power converter 64 and/or regenerative power converter 112. Thus, the utility of the transient damping reactor 58, 100 may be expanded according to the exemplary power systems described herein to enhance the capabilities of the trolley capable mining truck 12.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

The invention claimed is:

1. A trolley capable mining truck, comprising:
a machine frame;
ground engaging propulsion elements coupled with the machine frame;
a pantograph supported on the machine frame and having an engaged configuration in which the pantograph is electrically connected with an overhead trolley line and a stowed configuration in which the pantograph is electrically disconnected from the overhead trolley line; and
a power system including:
an onboard electrical power source providing electrical power to a pair of electric drive propulsion motors along a first electrical path in a first configuration of the power system, wherein the onboard electrical power source includes an internal combustion engine coupled to an electrical power generator, wherein the electric drive propulsion motors power the ground engaging propulsion elements;
the pantograph providing electrical power from the overhead trolley line, through a transient damping reactor supported on the machine frame, and to the pair of electric drive propulsion motors along a second electrical path in a second configuration of the power system; and
a third configuration in which, during a braking mode of the trolley capable mining truck, the electric drive propulsion motors provide regenerative electrical power through a regenerative power converter including the transient damping reactor, through the pantograph, and to the overhead trolley line along a third electrical path.

2. The trolley capable mining truck of claim 1, wherein the transient damping reactor filters voltage transients occurring when the pantograph electrically connects with the overhead trolley line, and smoothes voltage waveforms of the regenerative electrical power provided to the overhead trolley line from the electric drive propulsion motors.

3. The trolley capable mining truck of claim 2, wherein the power system includes a fourth configuration in which the electric drive propulsion motors provide the regenerative electrical power to a resistor grid of the trolley capable mining truck, wherein the resistor grid dissipates the regenerative electrical power.

4. The trolley capable mining truck of claim 3, further including an onboard electronic controller switching between the first, second, third, and fourth configurations of the power system.

5. The trolley capable mining truck of claim 4, wherein the onboard electronic controller transitions the power system to the third configuration only if the pantograph is in the engaged configuration and the regenerative electrical power is above a predetermined threshold.

6. The trolley capable mining truck of claim 1, wherein the regenerative power converter is one of a buck converter and a boost converter.

7. The trolley capable mining truck of claim 1, wherein the regenerative power converter also includes an insulating gate bipolar transistor and a diode.

8. The trolley capable mining truck of claim 1, wherein the regenerative electrical power provided to the overhead trolley line from the electric drive propulsion motors is ultimately provided to an electric substation.

9. A method of operating a trolley capable mining truck including a power system, the method comprising steps of:
moving a pantograph into a stowed configuration in which the pantograph is electrically disconnected from an overhead trolley line;
propelling the trolley capable mining truck in a first configuration of the power system responsive to the stowed configuration at least in part by providing electrical power from an onboard electrical power source, which includes an internal combustion engine coupled to an electrical power generator, to a pair of electric drive propulsion motors;
moving the pantograph into an engaged configuration in which the pantograph is electrically connected to the overhead trolley line;
propelling the trolley capable mining truck in a second configuration of the power system responsive to the engaged configuration at least in part by providing electrical power from the overhead trolley line, through the pantograph, through a transient damping reactor, and to the electric drive propulsion motors; and
providing regenerative electrical power, in a third configuration of the power system and a braking mode of the trolley capable minding truck, from the electric drive propulsion motors, through a regenerative power converter including the transient damping reactor, through the pantograph, and to the overhead trolley line.

10. The method of claim 9, further including filtering voltage transients occurring when the pantograph electrically connects with the overhead trolley line using the transient damping reactor, and smoothing voltage waveforms of the regenerative electrical power provided to the overhead trolley line from the electric drive propulsion motors using the transient damping reactor.

11. The method of claim 10, further including providing the regenerative electrical power from the electric drive propulsion motors to a resistor grid of the trolley capable mining truck in a fourth configuration of the power system, and dissipating the regenerative electrical power using the resistor grid.

12. The method of claim 11, further including switching the power system between the first, second, third, and fourth configurations of the power system using an onboard electronic controller.

13. The method of claim 12, further including transitioning the power system to the third configuration only if the pantograph is in the engaged configuration and the regenerative electrical power is above a predetermined threshold.

14. The method of claim 9, wherein the providing step includes providing the regenerative electrical power to an electric substation through the overhead trolley line.

* * * * *